(12) United States Patent
Lawrence

(10) Patent No.: US 10,355,960 B2
(45) Date of Patent: Jul. 16, 2019

(54) DATA TRANSFER SYSTEM INCLUDING ONE-WAY DATALINK AND CONTINUOUS DATA SYNCHRONIZATION

(71) Applicant: Raytheon Applied Signal Technology, Inc., Sunnyvale, CA (US)

(72) Inventor: Nigel R. Lawrence, Oceanside, CA (US)

(73) Assignee: RAYTHEON APPLIED SIGNAL TECHNOLOGY, INC., Sunnyvale, CA (US)

( * ) Notice: Subject to any disclaimer, the term of this patent is extended or adjusted under 35 U.S.C. 154(b) by 42 days.

(21) Appl. No.: 15/698,945

(22) Filed: Sep. 8, 2017

(65) Prior Publication Data

US 2019/0081878 A1    Mar. 14, 2019

(51) Int. Cl.
*H04L 12/26* (2006.01)
*H04L 12/70* (2013.01)
*H04L 29/06* (2006.01)

(52) U.S. Cl.
CPC ...... *H04L 43/0894* (2013.01); *H04L 63/0428* (2013.01); *H04L 63/08* (2013.01); *H04L 2012/5672* (2013.01)

(58) Field of Classification Search
CPC ............ H04L 43/0894; H04L 63/0428; H04L 2012/5672; H04L 63/08
See application file for complete search history.

(56) References Cited

U.S. PATENT DOCUMENTS

| 6,570,883 B1 | 5/2003 | Wong | |
|---|---|---|---|
| 6,718,385 B1* | 4/2004 | Baker | H04L 63/02 709/225 |
| 7,941,526 B1* | 5/2011 | Hope | H04L 41/069 709/224 |
| 9,560,010 B1* | 1/2017 | Estes | H04L 63/0209 |
| 2017/0118123 A1 | 4/2017 | Ishii et al. | |

OTHER PUBLICATIONS

International Search Report and Written Opinion for International Application No. PCT/US2018/049476; Application Filing Date Sep. 5, 2018; dated Nov. 21, 2018 (13 pages).

* cited by examiner

*Primary Examiner* — Sharad Rampuria
(74) *Attorney, Agent, or Firm* — Cantor Colburn LLP

(57) ABSTRACT

A data transfer system is configured to transfer data from a data transmitting site to a data receiving site. The data transfer system includes a low-side network, at least one high-side network, and a one-way data (OWD) link. The OWD link is configured to perform unidirectional data transfer from the low-side network to the at least one high-side network. The OWD link continuously synchronizes the low-side network with the at least one high-side network while continuously transferring data through the OWD link.

21 Claims, 5 Drawing Sheets

DATA TRANSFER SYSTEM INCLUDING ONE-WAY DATALINK AND CONTINUOUS DATA SYNCHRONIZATION

BACKGROUND

The present disclosure relates to data transfer systems, and more particularly, to one-way datalink data transfer systems.

Data transfer systems typically include various security measures to prevent unauthorized access to proprietary data. One-way data (OWD) links have been developed as an alternative to physically transferring the data to and from one or more data systems (e.g., transferring data on to a portable storage medium at a first destination and travelling to a second data system to load the data on to a second destination to load the data on to the data system). An OWD link provides secure and reliable unidirectional data transfers between an unsecure data system (referred to a low-side network) and one or more secured data systems (referred to as a high-side network).

The OWD link typically includes an optical transmitter installed at a sending site (e.g., at the low-side network and an optical receiver at a receiving site (e.g., the high-side network). The optical transmitter can output optical data, but cannot receive optical data. Similarly, the optical receiver can receive optical data, but cannot transmit optical data. A unidirectional data transmission path, hereinafter referred to as a data diode, is interposed between the optical transmitter and the optical receiver.

A conventional data diode 100 is illustrated in FIG. 1. The data diode 100 utilizes a fiber optic system including a transmitter interface 102 and a receiver interface 104. Two separate paths, i.e., a transmission path 106 for transmitting data and a receiving path 108 for receiving data, are established between the transmitter interface 102 and the receiver interface 104. By breaking one of those paths (e.g., using a beam splitter 110), data can flow in only one direction, thereby establishing a unidirectional data transfer from transmitting interface 102 to the receiving interface 104. That is, the data diode 100 allows data to be sent from the transmitter interface 102 located at a low-side network and imported into the high-side network via the receiver interface 104, but prevents data from being exported from the high-side network to the low-side network. Accordingly, the OWD link establishes network security in a data network by isolating the high-side networks from potential security breaches (i.e., undesired and unauthorized data flow out of the secure network) while still providing the ability to import data from a low-security external source into a high-security network.

Data is typically imported from the low-side network to the high-side network according to a scheduled data importing operation or by manually submitting a command to import the data. For instance, a user uploads data to the low-side network and a scheduled data import operation is performed which imports the data from the low-side network to the high-side network. Conventional data systems that store large amounts of data typically perform the import operation once a day and during off-peak usage times. The data transfer, therefore, through the OWD link is non-continuous and occurs only during the scheduled importing operation. Accordingly, there may be delay from the time the data is uploaded at the low-side network and the time at which the data can be accessed at the high-side network.

SUMMARY

According to at least one non-limiting embodiment, a data transfer system is configured to transfer data from a data transmitting site to a data receiving site. The data transfer system includes a low-side network, at least one high-side network, and a one-way data (OWD) link. The OWD link is configured to perform unidirectional data transfer from the low-side network to the at least one high-side network. The OWD link continuously synchronizes the low-side network with the at least one high-side network while continuously transferring data through the OWD link.

According to another non-limiting embodiment, a method of transferring data from a data transmitting site to a data receiving site comprises establishing a transmitter interface in signal communication with a low-side network, and establishing a receiver interface in signal communication with at least one high-side network. The method further includes interconnecting a one-way data (OWD) link between the transmitter interface and the receiver interface. The method further includes performing unidirectional data transfer, via the OWD link, from the low-side network to the at least one high-side network. The method further includes continuously synchronizing the low-side network with the at least one high-side network while continuously transferring data through the OWD link.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Various embodiments of the disclosure provide a data transfer system that implements an OWD link including one or more data diodes interconnected between a transmitter interface and one or more receiver interfaces. The transmitter interface is in signal communication with a low-side network, while the receiver interface is in signal communication with one or more high-side networks. The data diode is configured to establish unidirectional data flow exclusively from the transmitter interface to the receiver interface.

In at least one embodiment, data transfer through the data diode is initiated in response to loading a data file in a low-side data directory in signal communication with the low-side network. The transmitter interface is configured to synchronize the low-side data directory with a high-side data directory residing at the high-side network. In at least one embodiment, the receiver interface utilizes data messages provided by the transmitter interface to reconstruct the transferred data files in the corresponding high-side data directory. After synchronization has completed, the receiver interface can verify whether the data transfer was successful. In this manner, the transferred data files stored in the high-side network are viewed as copies of their corresponding original data files initially loaded in the low-side network, and can be served locally to applications on the high side network from the receiver.

Figure 1:
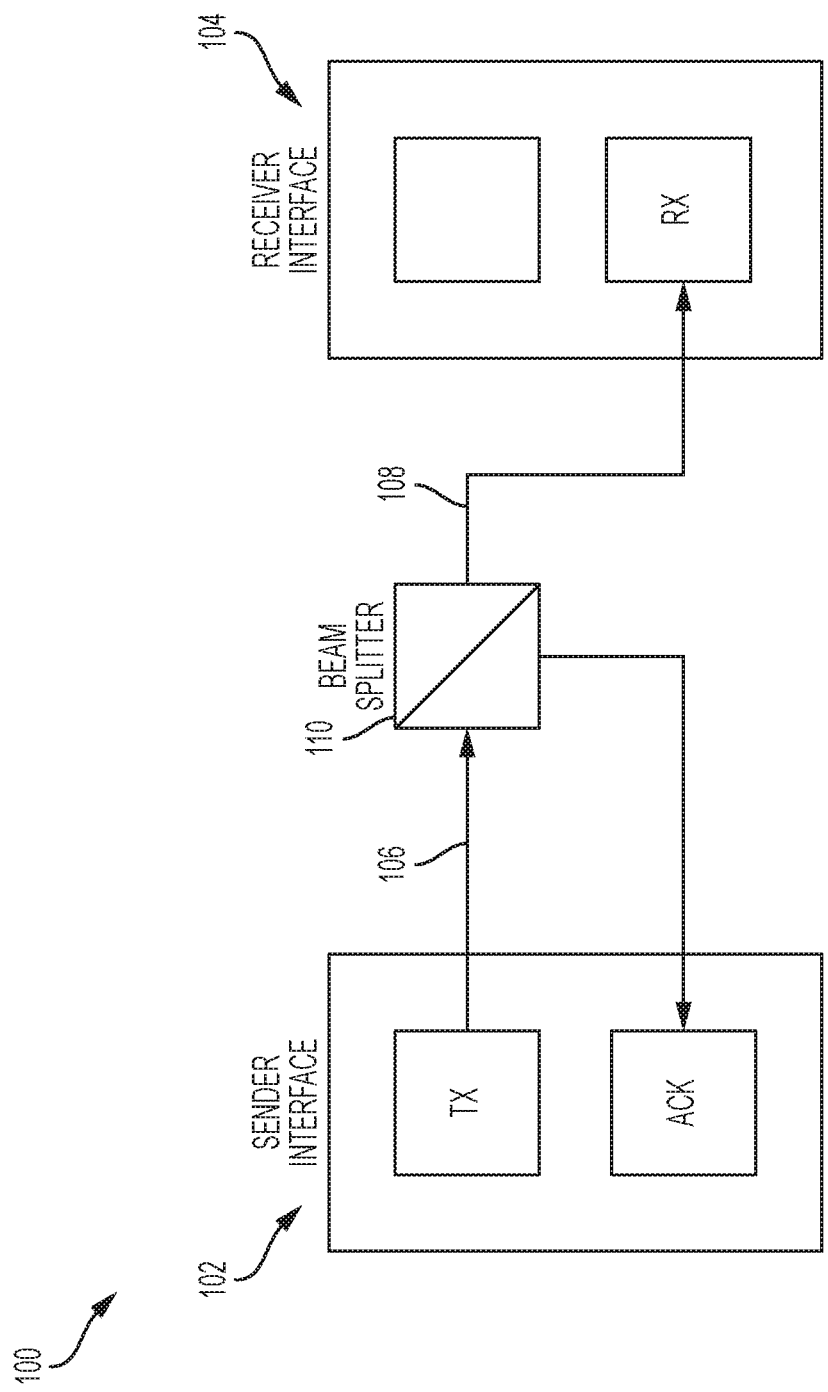
FIG. 1 illustrates a conventional data diode.
Figure 2:
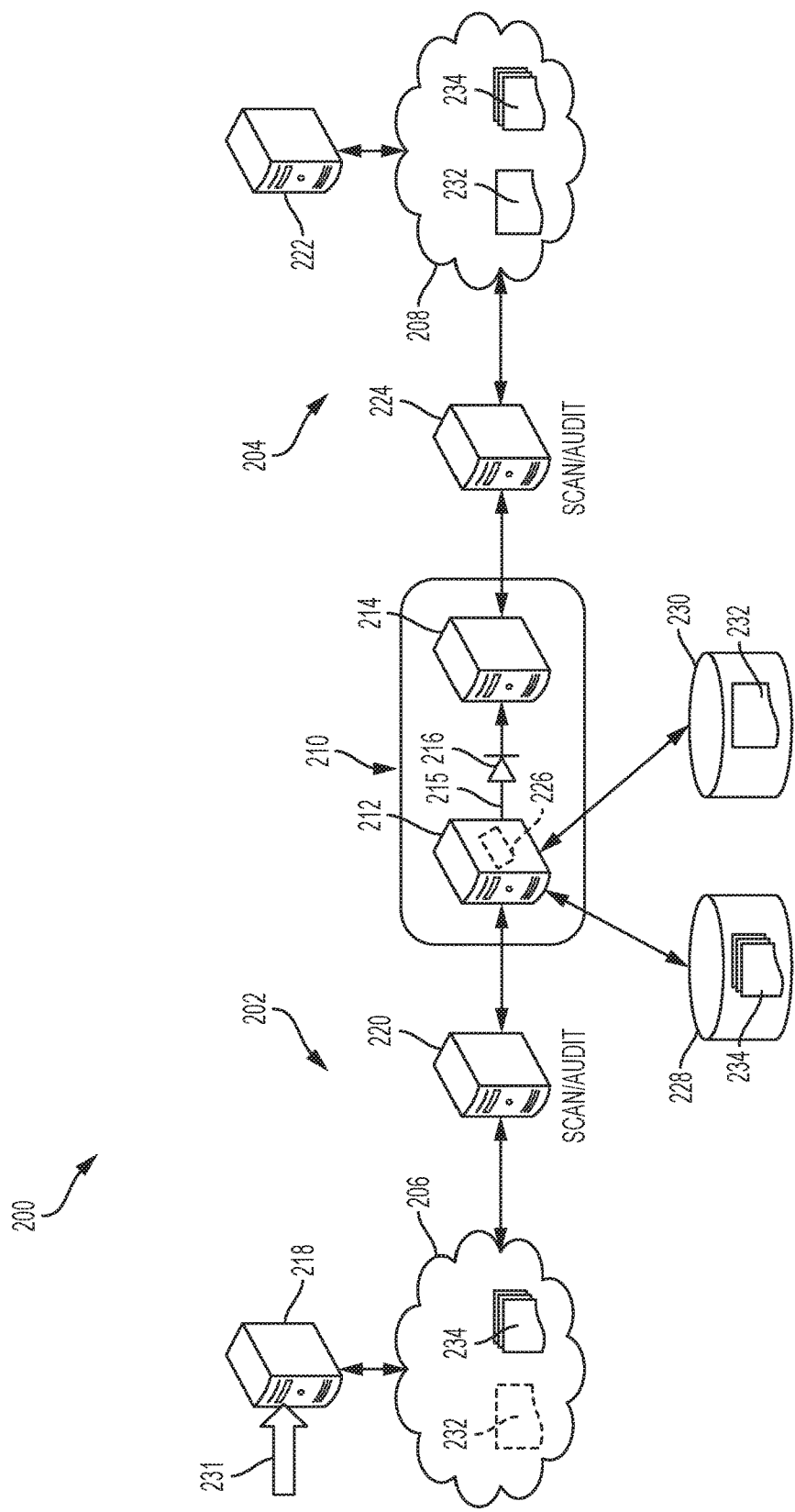
FIG. 2 illustrates a data transfer system according to a non-limiting embodiment.

Referring now to FIG. 2, a data transfer system 200 configured to transfer data from a data transmitting site 202 to a data receiving site 204 is illustrated according to a non-limiting embodiment. The data transfer system 200 includes a low-side network 206 installed at the data transmitting site 202, one or more high-side networks 208 installed at the data receiving site 204, and one or more OWD links 210. The low-side network 206 and/or the high-side networks 208 can be implemented, for example, as a wired data server network, a cloud-computing network, and a storage data network (SDN).

The OWD link 210 includes a transmitter interface 212 installed at the data transmitting site 202, at least one receiver interface 214 installed at the receiving site 204, and at least one data diode 216 interconnected between the transmitter interface 212 and the receiver interface 214. For example, the data diode 216 includes an input in signal communication with the transmitter interface 212 and an output in signal communication with the receiver interface 214. In this manner, the data diode 216 can establish a unidirectional data transmission path 215 from the transmitting site 202 to the receiving site 204. The unidirectional data transmission path 215 is achieved by allowing data to pass from the transmitter interface 212 to the at least one receiver interface 214, while blocking data from being transferred between the receiver interface 214 and the transmitter interface 212.

In at least one embodiment the transmitting site 202 includes a low-side server 218 in signal communication with the low-side network 206, and the receiving site 204 includes a high-side server 222 in signal communication with the high-side network 208. The low-side server 218 and high-side server 222 can be constructed as any type of storage device capable of storing data, such as a data sever, a storage area network (SAN), etc. Each of the low-side server 218 and the high-side server 222 can also be constructed as an electronic hardware controller that includes memory and a processor configured to execute algorithms and computer-readable program instructions stored in the memory. Although the low-side server 218 and the high-side sever 222 are illustrated as being external from the low-side network 206 and the high-side network, respectively, it should be appreciated that the low-side server 218 can be implemented in the low-side network 206 to establish a low-side cloud-computing data server, and the high-side server 222 can be implemented in the high-side network 208 to establish a high-side cloud-computing data server.

The transmitting site 202 and the receiving site 204 can also include an optional low-side file scanning controller 220 and an optional high-side scanning controller 224. The low-side file scanning controller 220 is connected between the low-side network 206 and the transmitter interface 212, while the high-side file scanning controller 224 is connected between the receiver interface 214 and one or more of the high-side networks 208. The low-side file scanning controller 220 is configured to perform file security scanning operations on data uploaded to the low-side server 218. Similarly, the high-side file scanning controller 224 is configured to perform file security scanning operations on data received by the one or more of the receiver interfaces 214. The security scanning operations include, but are not limited to, file auditing, virus scanning, and file quarantining.

Still referring to FIG. 2, the transmitter interface 212 includes an electronic hardware data synchronization (sync) controller 226 in signal communication with a low-priority data queue 228 and a high-priority data queue 230. The sync controller 226 works in conjunction with the low-priority data queue 228 and the high-priority data queue 230 to continuously synchronize data files 231 uploaded at the transmitting site 202 with reassembled data delivered to the receiving site 204. In at least one embodiment, the data sync controller 226 monitors a state of the low-side server 218 while data is transmitted through the data diode 216. Based on the state of the low-side server 218, the sync controller 226 controls the transfer of data files 231 through the data diode 216. Monitoring the state of the low-side server 218 includes, for example, detecting a newly added or modified data file 232 in the low-side server 218. In at least one embodiment, the sync controller 224 identifies a modified data file 232 when a data file 231 stored in the low-side server 218 is changed or modified within a time period threshold, and identifies an un-modified file when a data file 231 stored in the low-side server 218 has not been changed or modified within the time period threshold.

In at least one embodiment, the sync controller 226 controls the transfer of data files by transferring un-modified data files 234 stored in the low-side server 218 into the low-priority queue 228 and transferring newly added or modified data files 232 into the high-priority queue 230. By separating un-modified data files 234 from newly added or modified data files 232, the sync controller 226 can establish a data transfer priority scheme that allows for synchronizing data files 231 uploaded at the transmitting site 202 with files imported to the receiving site 204. For example, the sync controller 226 can transfer newly added or modified data files 232 through the data diode 216 before transferring the un-modified data files 234 through the data diode 216. In at least one embodiment, the sync controller 226 transfers the newly added or modified data files 232 to the at least one receiver interface 214 until the high-priority queue is empty 230. In response to emptying the high-priority queue 230, the sync controller 226 initiates transfer of the un-modified files 234 from the low-priority data queue 228 to one or more of the receiver interfaces 214. The sync controller 226 can also temporarily halt processing of the high-priority data queue 230 to allow data retrieval from the low-priority data queue 228. For example, over a given operating time, a percentage of that time (e.g., 20%) is allocated to processing the high priority queue, while the remaining time (e.g., 80%) is allocated to the low-priority queue. Accordingly, even if there are still items in the high-priority queue 230, there are times when data transfer from the high priority queue is halted to allow processing and data transfer of the low-priority items stored in the low-priority queue 228.

Data output from the data diode 216 is then received at the receiver interface 214, and the data is processed to generate a reassembled data file that is a copy of the original data file selected from the queues 228 and/or 230, i.e., the un-modified data file 234, the newly added or modified data file 232. In one or more embodiments, the high-side server 222 can perform a verification operation that verifies the integrity and accuracy of the reassembled data file with respect to the corresponding un-modified data file 234, or the newly added or modified data file 232. The verification operation can be performed using a hashing algorithm such as, for example, message digest hashing (e.g., MD5) or securing hash algorithm (e.g., SHA-256).

Figure 3:
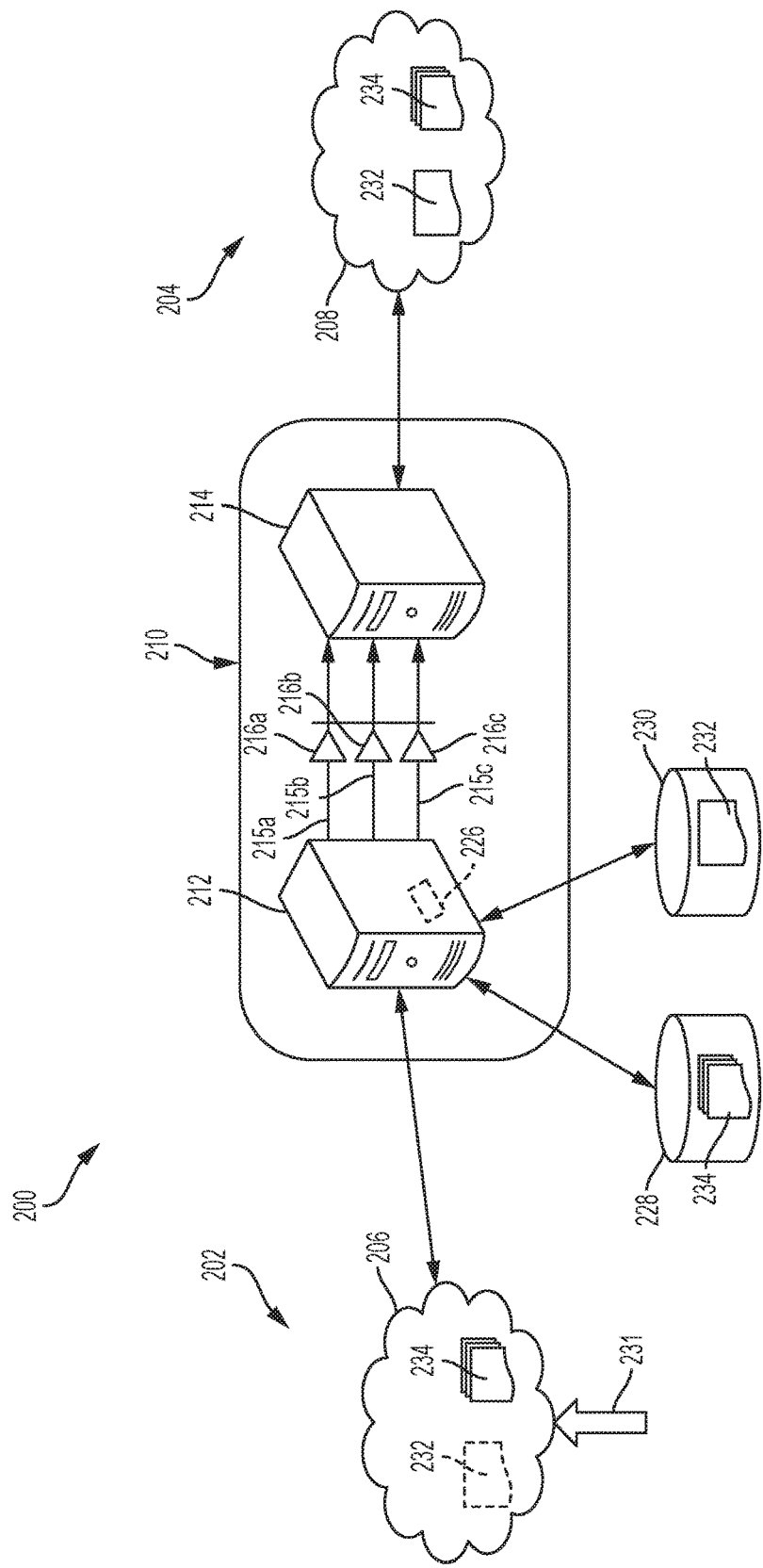
FIG. 3 illustrates a data transfer system according to a non-limiting embodiment.

Turning now to FIG. 3, a data transmission system 200 is illustrated according to another embodiment. As described above, the data transmission system 200 includes an OWD link 210 interconnected between a transmitter interface 212 and a receiver interface 214. The OWD link 210, however, includes a plurality of individual data diodes 216a, 216b, and 216c. Although three data diodes 216a-216c are illustrated, more or less data diodes can be employed. Each data diode 216a, 216b and 216c establishes an individual unidirectional data transmission path 215a, 215b and 215c, respectively, which links the transmitter interface 212 to one or more receiver interfaces 214. The data diodes 216a, 216b and 216c can be utilized to transfer data in parallel corresponding to a single data file, and/or can be utilized such that each data diode 216a, 216b and 216c transfers data corresponding to different data files sent to a respective data transmission path 215a, 215b and 215c.

The transmitter interface 212 can include a hardware transmitter controller that executes an installed operating system (OS) as well as OWD transmitting software. The OWD software can include an OWD software daemon capable of synchronizing data files transferred from the transmitting site to the receiving site. The OWD software daemon can be established using a minimal configuration file that contains directives such as which directory to synchronize, which interface(s) to use, and transfer settings that dictate how the files are transmitted. In at least one embodiment, the sender daemon controls data transfer from the transfer site 202 to the receiving site 204 by prioritizing data files 234 sent to the low-priority queue 228 compared to data files 232 sent to the high-priority queue 230. In at least one embodiment, newly stored files are transmitted first, but in normal operation the sender will always be in the process of transmitting a file(s).

Similar to the transmitter interface 212, the receiver interface 214 includes a receiver controller configured to execute a receiver operating system (OS). OWD receiver software is also part of the receiver interface 214, and functions to facilitate file reception and reassembly of the transmitted data files. The receiver interface 214 stores a minimal configuration file that it uses to specify which interface(s) and synchronization directory to use, and is self-configuring in that it does not require advance knowledge of the transmitter interface's 212 transmission options. In at least one embodiment, the receiver interface 214 receives the data files as segments, and reassembles the segments as they are received to generate a reassembled data file that is a copy of the original data file uploaded at the transmitting site 202. The receiver interface 214 is also capable of completing data transfers even in the face of lost packets due to an error recovery mechanism built into the protocol. After files are reassembled and verified at the receiver interface 214, they are made available to other applications.

In one or more embodiments, the data packets that form a transferred data file are contained in Ethernet frames and are given a single custom EtherType. The protocol has several different frame types and a state machine defining the process for using them. The fame types include, for example, initialization frames, data frames, and verification frames. The initialization frames configure the receiver interface 214 and are sent out before performing a new transmission. The data frames contain the actual data of the selected data file to be transferred. The verification frames are used to verify successful file transfers and in some cases to notify the receiver interface whether an existing data file has been modified.

A typical transmission follows one of two similar paths depending on the size of the file to be transmitted. For a small file, the initialization frames are sent by the transmitter interface 212 and then immediately followed by data frames which are then followed by one or more verification frames. The initialization frames set up all of the transfer parameters such as an amount of redundancy to be used (determined by the parity frame window size), the size of the transfer, which type of checksum to use for the transfer, the filename, if it is part of a multi-part transfer, etc. The data frames are almost entirely composed of data as well as a data frame identifier (ID) which is used to order the frames. All data frames are sent out of order and maximally separated from the other frames within their parity frame window. As the frames are received at the receiving site 204, the data file is reconstructed at the receiver interface 214 which will opportunistically reassemble the data file before the transmission is fully completed. As soon as the data file is reassembled, it is verified against the original checksum and if it passes the transfer is deemed successful by the receiver interface 214.

A similar transfer process is performed for larger data files. For example, an initial verification frame(s) is sent by the transmitter interface 212 to notify the receiver interface 214 that a multi-part transfer will occur. The initial verification is then followed by a number of transmissions that work almost identically to the case of the small file transfer. Each of these small transfers is used to handle a segment of the large file, and upon completion of all segments another verification frame(s) is sent. This final verification frame is used to verify the entire data file, and if it passes the checksum it is deemed a successful transfer by the receiver interface 214.

In at least one embodiment, the receiver interface utilizes a parity frame window to reconstruct segments of data to generate the reconstructed data file at the receiver interface 214. The parity frame window is a group of "n" frames containing "n−1" data frames and 1 parity frame. The parity frame is a frame constructed by "XORing" the data in the other n−1 data frames together, and can be used to reconstruct any one missing frame within the parity frame window. The window size is variable, and can be used to tune how much redundancy is included in the protocol and therefore how much loss can be tolerated (e.g., a frame window of 5 can lose 1 of 5 frames or 20% of the frames in the parity frame window).

The sync controller 226 controls data transfer through the OWD link 210 based on an existing load of one or more of the transmission paths 215a, 215b, 215c. For example, the transmission paths 215a, 215b, 215c are capable of transferring a different data files selected from the queues 228, 230. When the sync controller 226 determines that one data transmission path (e.g., transmission path 215a) is busy transferring a first data file or the data amount on the transmission path 215a exceeds a threshold value, the sync controller 226 can select one or more of the remaining data paths 215b and/or 215c to transfer one or more different data files. In this manner, the sync controller 226 can balance the data load of the OWD link 210.

Figure 4:
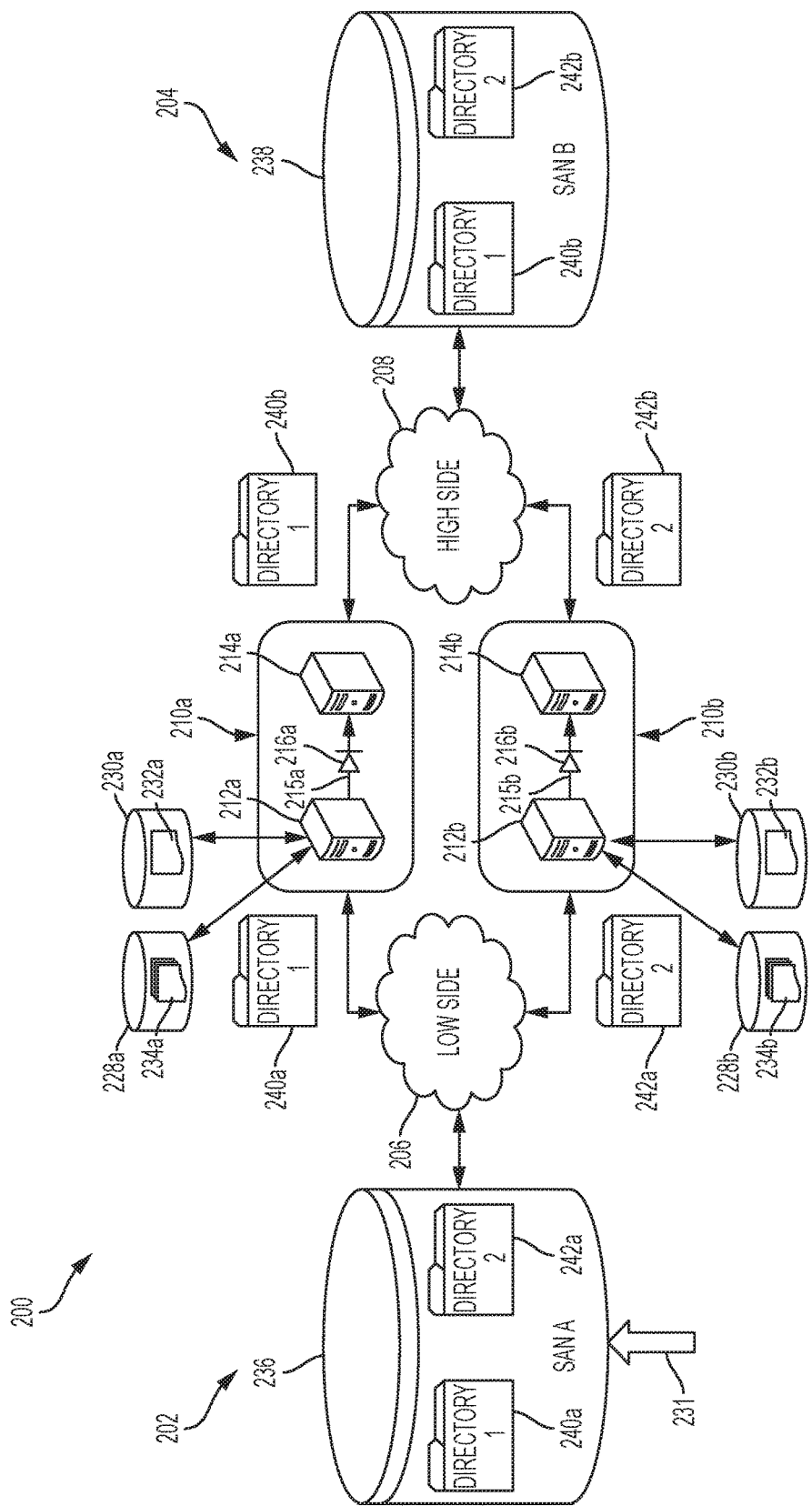
FIG. 4 illustrates a data transfer system according to a non-limiting embodiment.

Referring now to FIG. 4, a data transmission system 200 includes a plurality of OWD links as opposed to a single OWD link. In the non-limiting embodiment of FIG. 4, the data system 200 includes a first OWD link 210a and a second OWD link 210b. The first OWD link 210a includes a first transmitter interface 212a and a first receiver interface 214a. The first transmitter interface 212a is in signal communication with a low-side storage area network (SAN)

236, and the first receiver interface 214 is in signal communication with a high-side SAN 238. The second OWD link 210b includes a second transmitter interface 212b and a second receiver interface 214b. The second transmitter interface 212b is in signal communication with the low-side SAN 236, and the second receiver interface 214b is in signal communication with the high-side SAN 238.

The low-side SAN 236 stores a plurality of different low-side data file directories. Each data low-side data directory corresponds to a high-side data directory stored in the high-side SAN 238. For example, the low-side SAN 236 stores a first low-side data directory 240a and a second low-side data directory 242a, while the high-side SAN 238 includes a first high-side data directory 240b and a second high-side data directory 242b. Although two different corresponding sets of data directories 240a-242a and 240b-242b are illustrated as being stored in the SANs 236 and 238, respectively, more data directories can be employed.

The data transfer system 200 is configured to sync data files 231 loaded into one or more of the low-side data directories 240a and 242a, with reassembled data files loaded in their corresponding high-side data directories 240b and 242b. In at least one non-limiting embodiment, the first OWD link 210a transfers data corresponding to a one or more data files stored in the first low-side data directory 240a to its corresponding high-side data directory 240b, while the second OWD link 210b transfers data corresponding to a one or more data files stored in the second low-side data directory 242a to its corresponding high-side data directory 242b. Accordingly, each transmitter interface 212a and 212b is responsible for synchronizing a different data directory 240a and 242b, respectively, using their respective queues 228a-230a and 228b-230b, respectively. The receiver interfaces 214a and 214b are then responsible for reassembling and loading transferred data into the proper corresponding high-side data directory 240b and 242b.

Figure 5:
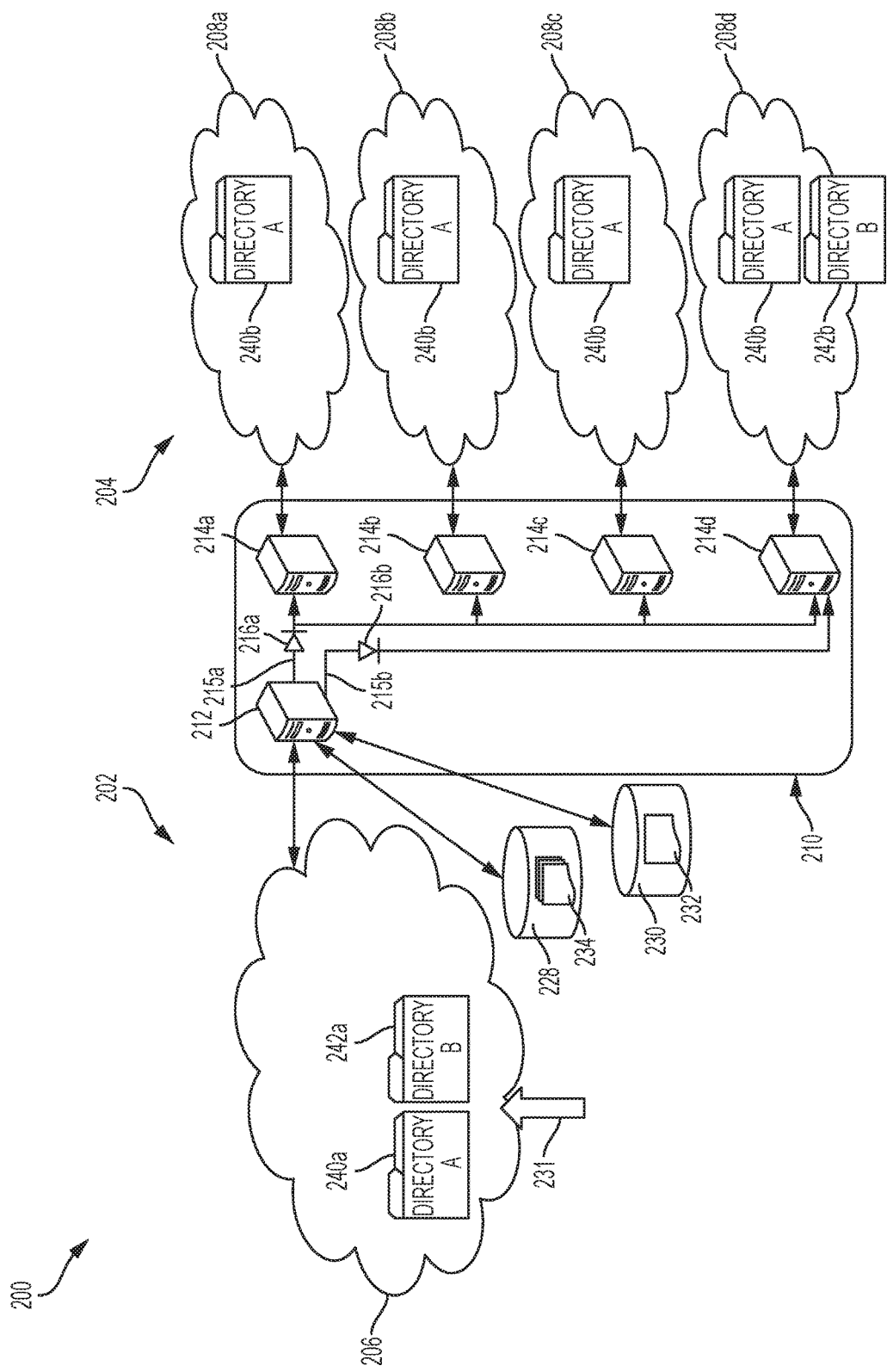
FIG. 5 illustrates a data transfer system according to a non-limiting embodiment.

Turning now to FIG. 5, the data transfer system 200 is illustrated according to another non-limiting embodiment. The transmitting site 202 includes a low-side network 206, while the receiving site 204 includes a plurality of high-side networks 208a, 208b, 208c and 208d. Although four separate high-side networks 208a, 208b, 208c, 208d are shown, more or less high-side networks can be employed. In at least one non-limiting embodiment, the data transfer system 200 also includes a plurality of receiver interfaces 214a, 214b, 214c and 214d. In this example, each receiver interface 214a, 214b, 214c and 214d is in signal communication with a respective high-side network 208a, 208b, 208c, 208d.

The low-side network 206 includes a first low-side data directory 240a and a different second low-side directory 242a. The high-side networks 208a, 208b, 208c, and 208d each include a first high-side data directory 240b. One or more of the high-side networks (e.g., network 208d) includes a different second high-side directory 242b. Each of the first high-side data directories 240b are to be synchronized with respect to the first low-side directory 240a. Similarly, the second high-side data directory 242b is to be synchronized with the first high-side data directory 242a. Although only single second high-side directory 242b is illustrated additional second-high side directories can be employed. In this scenario, each second high-side data directory 242b is synchronized with respect to the second low-side data directory 242a.

Still referring to FIG. 5, the OWD link 210 establishes a first transmission path 215a including a first data diode 216a, and a second transmission path 215b including a second data diode 216b. The first data diode 216a includes a first input in signal communication with the transmitter interface 212 and a first output in signal communication with each receiver interface 214a, 214b, 214c and 214d. Similarly, the second data diode 216b includes a second input in signal communication with the transmitter interface 212 and a second output in signal communication with the receiver interface (e.g., 214d) that is assigned to the second high-side data directory 242b. Accordingly, the first data diode 216a unidirectionally transfers data files from the first low-side data directory 240a to one or more of the first high-side data directories 240b, while the second data diode 216b unidirectionally transfers data files from the second low-side directory 242a to the second high-side directory 242b.

As illustrated in FIG. 5, the OWD link 210 demonstrates improved flexibility in terms of administrative scaling. The transmitter interface 212 and receiver interfaces 214a, 214b, 214c and 214d do not have to be connected in one-to-one relationship. Instead, a single transmitter interface 212 can serve several independent receiver interfaces 214a, 214b, 214c and 214d. By constructing the data diodes 216a and 216b as a beam splitter, the transmission paths 215a and 215b can split a signal or data in "n" number of ways, and n−1 receiver interfaces can be synchronized to a single transmitter interface simply by splitting the fiber on a respective transmission path 215a and/or 215b. Furthermore, if a transmitter interface 212 can support up to "x" number of transmission paths, a single transmitter interface 212 can be used to synchronize up to x*(n−1) total receiver interfaces 214. The transmitter interface 212 can also select which data streams or data files to deliver to one or more selected receiver interfaces 214a, 214b, 214c and 214d based on the connection of the transmission paths 215a and 215b, and how the respective data diodes 216a and 216b are connected. For example, the two transmission paths 215a and 215b illustrated in FIG. 5 can be utilized by a single transmitter interface 212 to synchronize two different directories, e.g., 240a-240b and 242a-242b. The first set of data directories 240-240b are shared across all receivers 214a, 214b, 214c and 214d. However, the second set of data directories 242a-242b are shared exclusively using one of the receiver interface (e.g., receiver interface 214d).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" or "controller" refers to an application specific integrated circuit (ASIC), an electronic circuit, a computer processor (shared, dedicated, or group) and memory that executes one or more software or firmware programs, a combinational logic circuit, a microcontroller including various inputs and outputs, and/or other suitable components that provide the described functionality. When implemented in software, a module can be embodied in memory as a non-transitory machine-readable storage medium readable by a processing circuit (e.g., a microprocessor) and storing instructions for execution by the processing circuit for performing a method.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A data transfer system configured to transfer data from a data transmitting site to a data receiving site, the data transfer system comprising:
   a low-side network;
   at least one high-side network; and
   a one-way data (OWD) link configured to perform uni-directional data transfer from the low-side network to the at least one high-side network;
   a transmitter interface in signal communication with the transmitting site;
   at least one receiver interface in signal communication with the receiving site; and
   at least one data diode having an input in signal communication with the transmitter interface and an output in signal communication with the at least receiver interface,
   wherein the OWD link continuously synchronizes the low-side network with the at least one high-side network while continuously transferring data through the OWD link, and
   wherein the transmitter interface includes an electronic hardware data synchronization (sync) controller in signal communication with a low-priority data queue that stores un-modified data files and a high-priority data queue that stores at least one of newly added data files and modified data files.

2. The data transfer system of claim 1, wherein the sync controller selects the un-modified data files from the low-priority queue and the at least one newly added files and modified files from the high-priority queue to continuously synchronize an original data file loaded at the transmitting site with a reassembled copy of the original data file transferred to the receiving site.

3. The data transfer system of claim 2, wherein the sync controller synchronizes the original data file and the reassembled copy of the original data file by monitoring a state of a low-side server and controlling a transfer of data through the data diode based on the state of the low-side server.

4. The data transfer system of claim 3, wherein the sync controller monitors the state of the low-side server by detecting at least one of a newly added data file in the low-side server and a modified data file in the low-side server.

5. The data transfer system of claim 4, wherein the sync controller identifies a modified file when a data file stored in the low-side server is changed or modified within a time period threshold, and identifies an un-modified data file when a data file stored in the low-side server has not been changed or modified within the time period threshold.

6. The data transfer system of claim 4, wherein the sync controller controls the transfer of data files by transferring un-modified data files stored in the low-side server into the low-priority queue and transferring at least one of the newly added data file and the modified data file into the high-priority queue, and subsequently transfers at least one of the newly added data file and the modified data file through the data diode before transferring the un-modified data file through the data diode.

7. The data transfer system of claim 6, wherein the sync controller controls the transfer of data files by transferring files from the high-priority queue to the at least one receiver interface for a first amount of time before halting data transfer from the high-priority queue and transferring un-modified files from the low-priority queue to the at least one receiver interface for a second amount of time that is different from the first amount of time.

8. The data system of claim 1, wherein the at least one data diode includes a plurality of data diodes, each data diode establishing an individual transmission path from the transmitter interface to the at least one receiver interface.

9. The data system of claim 8, wherein the sync controller selects at least one transmission path among the plurality of transmission paths to transfer at least one of the newly added file, the modified file and the un-modified data file based on an existing load of the transmission paths.

10. The data system of claim 1, wherein the at least one OWD link includes a plurality of OWD links connected between the transmitting site and the receiving site.

11. The data system of claim 10, wherein the plurality of OWD links comprises:
    a first OWD link including a first transmitter interface and a first receiver interface, the first transmitter interface in signal communication with a low-side storage unit, and the first receiver interface in signal communication with a high-side storage unit; and
    a second OWD link including a second transmitter interface and a second receiver interface, the second transmitter interface in signal communication with the low-side storage unit, and the second receiver interface in signal communication with the high-side storage unit.

12. The data system of claim 11, wherein the low-side storage unit includes a first low-side data directory and a second low-side data directory different from the first low-side data directory, and the high-side storage unit includes a first high-side data directory and a second high-side data directory different from the first high-side directory.

13. The data system of claim 12, wherein the first OWD link transfers data from the first low-side data directory to the first high-side data directory, and the second OWD link transfers data from the second low-side data directory to the second high-side data directory.

14. The data system of claim 1, wherein the at least one high-side network includes a plurality of high-side networks, and
    wherein the at least one receiver interface includes a plurality of receiver interfaces, each receiver interface in signal communication with a respective high-side network among the plurality of high-side networks.

15. The data system of claim 14, wherein the low-side network includes a low-side data directory, and each high-side network includes a high-side data directory, and wherein the output of the at least one data diode is connected to each high-side network in signal communication with a high-side data network containing a high-side data directory.

16. The data system of claim 15, wherein the low-side network includes a second low-side data directory, and at least one of the high-side networks includes a second high-side data directory different from the first high-side data directory.

17. The data system of claim 16, wherein the at least one data diode includes a first data diode and a second data diode, the first data diode including a first input connected to the transmitter interface and a first output connected to each receiver interface, and the second data diode including a second input connected to the low-side network, and a second output connected to a receiver interface in signal communication with the at least one high-side network containing the second high-side data directory.

18. The data system of claim 17, wherein the first OWD link transfers data from the low-side data directory to at least one of the high-side data directories, and the second OWD link transfers data exclusively from the second low-side directory to the second high-side directory.

19. A method of transferring data from a data transmitting site to a data receiving site, the method comprising:
  establishing a transmitter interface in signal communication with a low-side network;
  establishing a receiver interface in signal communication with at least one high-side network;
  interconnecting a one-way data (OWD) link between the transmitter interface and the receiver interface to perform unidirectional data transfer from the low-side network to the at least one high-side network
  storing un-modified data files in a low-priority data queue, and storing at least one of newly added data files and modified data files in a high-priority data queue; and
  continuously synchronizing the low-side network with the at least one high-side network while continuously transferring data through the OWD link,
  wherein continuously synchronizing the low-side network with the at least one high-side network comprises selecting, via a sync controller, the un-modified data files from the low-priority queue and the at least one newly added files and modified files from the high-priority queue to continuously synchronize an original data file loaded at the transmitting site with a reassembled copy of the original data file transferred to the receiving site.

20. The method of claim 19, wherein the sync controller synchronizes the original data file and the reassembled copy of the original data file by monitoring a state of a low-side server and controlling a transfer of data through the data diode based on the state of the low-side server.

21. The method of claim 20, wherein the sync controller monitors the state of the low-side server by detecting at least one of a newly added data file in the low-side server and a modified data file in the low-side server.

* * * * *